(12) United States Patent
Querejeta Andueza (10) Patent No.: US 10,801,639 B2
(45) Date of Patent: Oct. 13, 2020

(54) ELECTROMAGNETIC GAS VALVE, GAS REGULATING VALVE AND GAS COOKING APPLIANCE

(71) Applicant: Copreci, S. Coop., Aretxabaleta (ES)

(72) Inventor: Félix Querejeta Andueza, Hendaye (FR)

(73) Assignee: COPRECI, S. COOP., Aretxabaleta (ES)

(*) Notice: Subject to any disclaimer, the term of this patent is extended or adjusted under 35 U.S.C. 154(b) by 0 days.

(21) Appl. No.: 16/136,518

(22) Filed: Sep. 20, 2018

(65) Prior Publication Data
US 2019/0085998 A1    Mar. 21, 2019

(30) Foreign Application Priority Data
Sep. 20, 2017 (EP) ..................... 17382622

(51) Int. Cl.
*F16K 31/06* (2006.01)
*F16K 31/08* (2006.01)
(Continued)

(52) U.S. Cl.
CPC ........ *F16K 31/0655* (2013.01); *F16K 1/2007* (2013.01); *F16K 5/02* (2013.01);
(Continued)

(58) Field of Classification Search
CPC .... F16K 31/0682; F16K 31/082; F16K 21/02; F16K 31/0655; F16K 31/0658; F23N 1/005; F23N 1/007; F23N 2035/14; F23N 2035/22; F23N 2035/24; F23N 2041/08; F23N 2900/05002; F23N 2235/14;
(Continued)

(56) References Cited

U.S. PATENT DOCUMENTS 1,320,843 A * 11/1919 Claus .................. F23N 1/007
239/574
2,280,739 A    4/1942 Ball
(Continued)

FOREIGN PATENT DOCUMENTS

ES        2531282 A1    3/2015
WO    2013143830 A1    10/2013

OTHER PUBLICATIONS

Extended European Search Report in corresponding EP Application No. 17382622.3, dated Mar. 12, 2018.

*Primary Examiner* — Kevin F Murphy
*Assistant Examiner* — Jonathan J Waddy
(74) *Attorney, Agent, or Firm* — Edell, Shapiro & Finnan, LLC (57) ABSTRACT

Electromagnetic gas valve with a gas inlet, a gas outlet, and a closure member that is displaceable between an opening position and a closing position. A maximum flow is supplied through the gas outlet with the closure member in the open position and a minimum flow being supplied with the closure member in the closed position. The valve includes a main fluid channel with a closure hole through which the maximum flow is supplied to the gas outlet. The closure member includes a secondary fluid channel calibrated for the minimum flow to pass therethrough, such that the closure member in the closed position covers the closure hole and allows the passage of gas through the secondary fluid channel.

18 Claims, 5 Drawing Sheets

(51) Int. Cl.
*F23N 1/00* (2006.01)
*F16K 31/00* (2006.01)
*F16K 1/20* (2006.01)
*F16K 5/02* (2006.01)

(52) U.S. Cl.
CPC ........ *F16K 31/003* (2013.01); *F16K 31/0658* (2013.01); *F16K 31/0675* (2013.01); *F16K 31/0682* (2013.01); *F16K 31/082* (2013.01); *F23N 1/005* (2013.01); *F23N 1/007* (2013.01); *F23K 2900/05002* (2013.01); *F23N 2235/14* (2020.01); *F23N 2235/22* (2020.01); *F23N 2235/24* (2020.01); *F23N 2241/08* (2020.01)

(58) Field of Classification Search
CPC ............. F23N 2235/22; F23N 2235/24; F23N 2241/08; Y10T 137/86855
USPC ..................................................... 251/129.21
See application file for complete search history.

(56) References Cited

U.S. PATENT DOCUMENTS

| | | | | |
|---|---|---|---|---|
| 2,876,753 A * | 3/1959 | Chandler | .................. | F02D 9/00 123/395 |
| 3,001,547 A * | 9/1961 | Brumbaugh | .............. | F16K 5/10 137/614.17 |
| 3,298,677 A * | 1/1967 | Anderson | ............. | F02D 9/1015 261/62 |
| 3,448,923 A | 6/1969 | Saponara | | |
| 3,675,681 A * | 7/1972 | Obermaier | ................ | F16K 1/22 137/625.3 |
| 3,759,499 A * | 9/1973 | Lang | ...................... | F02M 19/00 261/41.5 |
| 3,785,628 A * | 1/1974 | Lang | ...................... | F02M 19/00 261/65 |
| 4,020,870 A * | 5/1977 | Carlson | ................. | F16K 5/0214 137/625.3 |
| 4,055,326 A * | 10/1977 | Sanders | .................... | F16K 1/38 251/351 |
| 4,130,128 A * | 12/1978 | Kaneko | ................. | F16K 5/0605 137/269 |
| 4,356,801 A * | 11/1982 | Graham | .................. | F02D 9/101 123/337 |
| 4,478,286 A * | 10/1984 | Fineberg | ............... | E21B 34/101 166/324 |
| 4,899,981 A * | 2/1990 | Thomas, Jr. | .......... | F16K 5/0605 138/45 |
| 5,156,372 A * | 10/1992 | Conrad | .................. | A01C 7/185 251/129.21 |
| 5,186,021 A * | 2/1993 | Keller | .................... | F25B 41/06 137/513.3 |
| 5,209,454 A * | 5/1993 | Engdahl | ............... | F16K 17/363 137/38 |
| 5,715,704 A * | 2/1998 | Cholkeri | ............. | F16K 31/0651 137/513.3 |
| 6,019,347 A * | 2/2000 | Adams | ................ | F16K 31/0651 251/129.05 |
| 6,079,497 A * | 6/2000 | Johnston | ............... | E21B 34/101 166/324 |
| 6,182,457 B1 * | 2/2001 | Enderle | ................. | F25B 41/062 137/513.3 |
| 6,367,283 B1 * | 4/2002 | Enderle | ................. | F25B 41/062 62/511 |
| 6,646,395 B2 * | 11/2003 | Reimann | ................ | F02D 9/104 123/336 |
| 7,204,313 B2 * | 4/2007 | Williams | ............... | E21B 34/101 166/324 |
| 7,490,627 B2 * | 2/2009 | Hourai | .................... | F16K 1/222 137/625.31 |
| 9,163,479 B2 * | 10/2015 | Rogers | .................. | E21B 34/066 |
| 2007/0144483 A1 * | 6/2007 | Torii | ....................... | F02D 9/103 123/337 |
| 2008/0271501 A1 * | 11/2008 | Roder | ....................... | F16K 31/082 70/175 |
| 2013/0260327 A1 * | 10/2013 | Oliva Aguayo | ........ | F23N 1/007 431/280 |
| 2014/0332096 A1 * | 11/2014 | Lee | ......................... | F16K 31/24 137/448 |
| 2014/0370449 A1 * | 12/2014 | Antxia Uribetxeberria | ................ | F23Q 3/008 431/264 |
| 2015/0330629 A1 * | 11/2015 | Albizuri Landazabal | .................... | F16K 5/0407 431/280 |

\* cited by examiner

ELECTROMAGNETIC GAS VALVE, GAS REGULATING VALVE AND GAS COOKING APPLIANCE

CROSS-REFERENCE TO RELATED APPLICATIONS

This application relates to and claims the benefit and priority to European Patent Application No. EP17382622.3, filed Sep. 20, 2017.

TECHNICAL FIELD

The present invention relates to electromagnetic gas valves, gas regulating valves and gas cooking appliances.

BACKGROUND

Electromagnetic gas valves allowing the passage of a minimum flow of gas in the closed position are known. These electromagnetic gas valves are arranged in gas cooking appliances, for example, between the gas burner and the manual gas regulating valve by means of which the flow of gas to the gas burner is regulated.

ES2531282A1 describes a gas burner arrangement of this type. The electromagnetic gas valve that is inserted between the gas burner and the gas regulating valve comprises a gas inlet, a gas outlet, and a closure member that is displaceable between an open position and a closed position, a maximum flow being supplied through the gas outlet when the closure member is in the open position and a minimum flow being supplied when the closure member is in the closed position. To that end, the electromagnetic gas valve comprises a main fluid channel which is closed when the closure member is in the closed position, and a secondary fluid channel that is always opening parallel to the main fluid channel.

SUMMARY OF THE DISCLOSURE

A first aspect relates to an electromagnetic gas valve for a gas cooking appliance, comprising a gas inlet, a gas outlet, and a closure member that is displaceable between an open position and a closed position, a maximum flow being supplied through the gas outlet when the closure member is in the open position and a minimum flow being supplied when the closure member is in the closed position.

The electromagnetic gas valve comprises a main fluid channel comprising a closure hole through which the maximum flow is supplied to the gas outlet when the closure member is in the open position, and the closure member comprises a secondary fluid channel configured for the minimum flow to pass therethrough, such that when it is in the closed position the closure member covers the closure hole and allows the passage of gas through only the secondary fluid channel.

The fact that the secondary fluid channel is in the actual closure member means that it is not necessary to add a secondary fluid channel that is constructively separated from the main fluid channel. This has the advantage that the electromagnetic gas valve only needs to receive therein a single gas conduit instead of two, whereby obtaining a dimensionally more compact and constructively less complex solution.

A second aspect relates to a gas regulating valve comprising an electromagnetic gas valve like the one described above. The fact that a single gas conduit passes through the electromagnetic gas valve means that it can be readily coupled at the outlet of the gas regulating valve and that the gas regulating valve is still compact. In prior art solutions, the gas regulating valve and the electromagnetic gas valve are always incorporated in gas cooking appliances as two separate elements attached by means of a gas pipe. When the electromagnetic gas valve is incorporated in the gas regulating valve, one element is added instead of two, giving rise to a solution that takes up less space and is simpler and less expensive. Another advantage of the gas regulating valve is that it can be built with the electromagnetic gas valve coupled at the outlet of a conventional gas regulating valve.

A third aspect relates to a gas cooking appliance comprising at least one gas burner and a gas regulating valve like the one described above, in fluid communication with the gas burner. The electromagnetic gas valve separated from the actual gas regulating valve is dispensed with in the gas cooking appliance, with the subsequent advantages in terms of space taken up, simplicity and cost.

These and other advantages and features will become evident in view of the drawings and the detailed description.

DETAILED DESCRIPTION

FIGS. 1 to 4 show an embodiment of the electromagnetic valve 100, which is an electromagnetic valve having the configuration of a connector, with two internal threads at the ends thereof (not shown in the drawings), for being attached to other elements. This electromagnetic valve 100 can be arranged, for example, in a gas burner arrangement including a gas burner and a manual gas regulating valve to regulate the flow of gas to the gas burner, inserted between the gas burner and the gas regulating valve.

The electromagnetic gas valve 100 comprises a body 80 configured in this embodiment like a connector and having an internally hollow, substantially cylindrical shape, two internal threads, one at each of the ends thereof, and an outer hexagonal-shaped projection to make it easier to fix same by means of a tool. The body 80 is manufactured of a non-ferromagnetic material, preferably aluminum or brass, so as not to interfere with the electromagnetic operation of the electromagnetic valve 100. The body 80 comprises a gas inlet 10 at one end and a gas outlet 11 at the other end. The body 80 also comprises a main gas fluid channel 30, which is the hollow interior of the body 80, which is in fluid communication with the gas inlet 10 and the gas outlet 11, and a closure hole 40 arranged inside the main fluid channel 30. The electromagnetic valve 100 also comprises a closure member 50 that is displaceable and is arranged inside the main fluid channel 30. This closure member 50 in a closed position covers the closure hole 40, and in an open position it does not cooperate with the closure hole 40, allowing the flow of gas along the main fluid channel 30. The electromagnetic valve 100 comprises a secondary gas fluid channel 60 which is arranged in the closure member 50, such that when it is in the closed position the closure member 50 covers the closure hole 40 and allows the passage of gas through only the secondary fluid channel 60. The electromagnetic valve 100 also comprises an electromagnetic actuator 70 which allows the electromagnetic operation of the closure member 50 for displacement between the closed position and the open position.

Figure 3:
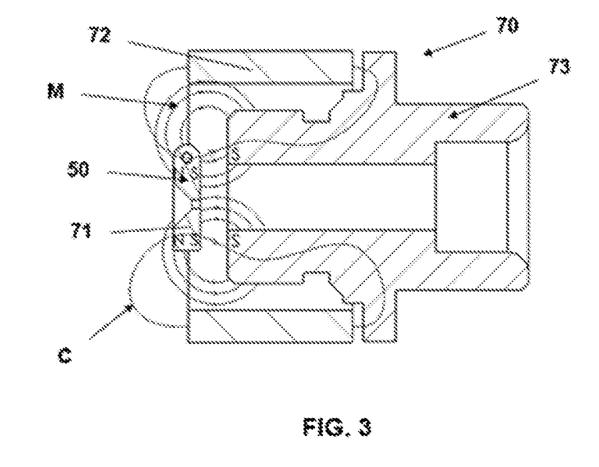
FIG. 3 shows a detailed section view of the electromagnetic actuator of the electromagnetic valve of FIG. 1, with the magnetic field generated by the magnet and the magnetic field generated by the coil, the closure member being in a stable closed position.
Figure 4:
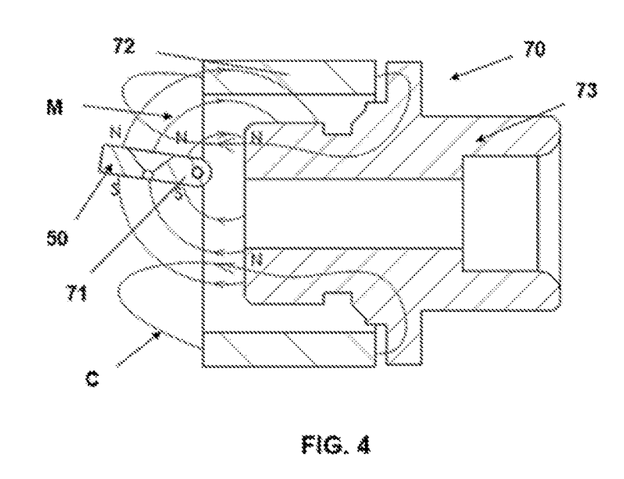
FIG. 4 shows a detailed section view of the electromagnetic actuator of the electromagnetic valve of FIG. 1, with the magnetic field generated by the magnet and the magnetic field generated by the coil, the closure member being in a stable open position.

According to one embodiment, the closure member 50 is a plate that pivots to go from the open position to the closed position and vice versa, and the electromagnetic actuator 70 comprises (i) a permanent magnet 71 generating a magnetic field M, the magnet 71 being arranged in the closure member 50 or the magnet 72 being the closure member 50 itself, (ii) a ferromagnetic element 73 arranged close to the closure member 50, and (iii) a coil 72 generating a magnetic field C when it is electrically powered, such that, depending on the current supplied to the coil 72, operational cooperation between the magnetic fields M and C occurs, causing the displacement of the closure member 50, to make the closure member 50 go from the closed position to the open position and vice versa. In this preferred embodiment, the closure member 50 is retained, both in the closed position and in the open position, due to the action of the magnetic field M generated by the magnet 71 on the ferromagnetic element 73 arranged close, as shown in FIGS. 3 and 4.

The embodiment shown in FIGS. 1 to 4 comprises the features described for an embodiment. In other embodiments of the electromagnetic valve 100 (not shown in the drawings), the magnet 71 can be an electromagnet, for which purpose it is necessary for the body of the magnet 71 to be electrically powered in order to generate the magnetic field M, and/or the electromagnetic valve comprises one or more magnets which are arranged inside the closure member or on the surface of the closure member.

In this embodiment of the electromagnetic valve 100, the ferromagnetic element 73 is manufactured of a ferromagnetic material, for example AISI430F, and is configured as a connector, with an internally hollow, substantially cylindrical shape, two internal threads, one at each of the ends thereof, and an outer hexagonal-shaped projection to make it easier to fix same by means of a tool. The ferromagnetic element 73 comprises a gas inlet 21 at one end and a gas outlet 20 at the other end, which are in fluid communication with one another. To configure the electromagnetic valve 100, the ferromagnetic element 73 is coupled to the body 80, the gas outlet 11 of the body 80 being screwed to the gas inlet 21 of the ferromagnetic element 73, the main fluid channel 30 of the electromagnetic valve 100 being formed inside the body 80 and inside the ferromagnetic element 73 between the gas inlet 10 of the body 80 and the gas outlet 20 of the ferromagnetic element 73. Since a passage of gas is produced along the main fluid channel 30, and the body 80 and the ferromagnetic element 73 forming it are screwed together, in order to prevent gas leakages through the threaded region, the attachment preferably comprises a compression region 81 in which the two parts come into contact, without being screwed together, at different angles.

The electromagnetic gas valve 100 also comprises a reel 74 which is manufactured in plastic, and having an internally hollow cylindrical shape, with two outer stops at each of the ends thereof. To assemble the reel 74 in the electromagnetic valve 100, the reel 74 is first assembled on the outside of the body 80, one of the stops of the reel 74 abutting with the outer projection of the body 80. The ferromagnetic element 73 is then coupled with the body 80, such that they abut with the other stop of the reel 74 and the outer projection of the ferromagnetic element 73, the reel 74 thereby being boxed in between the body 80 and the ferromagnetic element 73. The coil 72 is arranged wound on the outside of the body 80 on the surface of the body of the reel 74, between the two stops, the coil 72 thereby being stationary in this embodiment of the electromagnetic gas valve 100.

When the body 80, the ferromagnetic element 73 and the reel 74 are thus assembled with the coil 72 wound around same, and depending on the length given to the body of the ferromagnetic element 73, the body of the ferromagnetic element 73 is at least partially arranged in the inner space of the body 80, being spatially covered on the outside by the coil 72.

The electromagnetic gas valve 100 in this embodiment also comprises a guide 90 manufactured in plastic. This guide 90 allows coupling the closure member 50, and is in turn arranged tightly against the inner wall of the main fluid channel 30, in the region corresponding to the body 80. The guide 90 has a cylindrical shape, just like the main fluid channel 30, and is internally hollow, allowing fluid communication between the gas inlet 10 and the gas outlet 20 of the electromagnetic valve 100. The contour of the inside of the guide 90 has a substantially rectangular shape, similar to the shape of the closure member 50. The closure member 50 comprises in this embodiment a pivoting shaft 51 which goes through it laterally in the upper portion, two ends protruding laterally from the closure member 50. In other embodiments, the pivoting shaft 51 can evidently be integral with the closure member 50 or can be arranged on the inner side walls of the guide 90, or it can be an integral part of the guide 90. The pivoting shaft 51 can likewise be in different angular orientations, arranged orthogonally with respect to the longitudinal axis of the main fluid channel 30.

The guide 90 comprises two lateral pivoting guides 91 on the inner wall thereof at one end of the guide 90, and two other lateral pivoting guides at the other end of the guide 90, in a symmetrical position with respect to the guides 91. These guides arranged at each end of the guide 90 allow arranging the closure member 50 at one end of the guide 90 or the other. The guides are grooves that are open towards the ends of the guide 90, such that they allow readily assembling the pivoting shaft 51 of the closure member 50. The ends of the pivoting shaft 51 are boxed in the pivoting guides 91, the pivoting guides 91 allowing linear displacement of the shaft 51, and the pivoting guides 91 also allowing the pivoting of the closure member 50 around the shaft 51. Therefore, when the closure member 50 pivots to the open position from the closed position, or conversely to the closed position from the open position, in addition to pivoting the closure member 50, and therefore the magnet 71, the pivoting shaft 51 has freedom of linear movement in the pivoting guides 91.

In order for the closure member 50 to be able to close the closure hole 40 in the main fluid channel 30, the electromagnetic gas valve 100 also comprises a closure base 110, manufactured in an elastomeric material, i.e., a type of composite that does not include metals in its composition which exhibit an elastic behavior. The elastomers are usually thermosetting polymers, but they can also be thermoplastic polymers. The closure base 110 is arranged tightly against the inner wall of the main fluid channel 30, in the region corresponding to the body 80. The closure base 110 is in the form of a washer, with an outer cylindrical surface, like the main fluid channel 30, and is internally hollow, allowing fluid communication between the gas inlet 10 and the gas outlet 20 of the electromagnetic valve 100. The contour of the inside of the closure base 110 has a circular shape in this embodiment. When the closure member 50 is in the closed position, the face facing the gas outlet 20 of the electromagnetic valve 100 is supported on a side face of the closure base 110, such that the calibrated hole 62 of the secondary fluid channel 60 is in fluid communication with the hollow interior of the closure base 110, and therefore with the gas outlet 20. The inner circular cavity of the closure base 110 defines the closure hole 40 of the electromagnetic valve 100.

To assemble the guide 90 with the incorporated closure member 50 and the closure base 110 in the electromagnetic valve 100, the body 80 internally comprises a stop 82 in the main fluid channel 30. The guide 90 is introduced inside the main fluid channel 30 until it abuts with the stop 82, and then the closure base 110 is introduced until it abuts with the free end of the guide 90. Finally, and after having assembled, before or after, the reel 74 and the coil 72 on the reel as described above, the ferromagnetic element 73 is coupled to the body 80 by screwing them together. When the body 80 and the ferromagnetic element are fitted in the compression region 81, the end of the ferromagnetic element 73, inside the body 80, abuts with the free face of the closure base 110, and the outer projection of the ferromagnetic element 73 abuts with the corresponding stop of the reel 74. The electromagnetic gas valve 100 is thereby completely assembled.

As described, the electromagnetic gas valve 100 in this embodiment corresponds with a bi-stable electromagnetic valve, such that the closure member 50 changes position, by pivoting, when the coil 72 is electrically powered, and it holds its position in the event of the lack of a power supply to the coil 72, a power supply pulse being enough to cause the change in position, and the direction of the pivoting of the closure member 50 depending on the polarity of the pulse. Therefore, and given the constructive configuration of the electromagnetic gas valve 100 described above, the material surrounding the magnet 71 and the guide 90, which is the body 80 of the electromagnetic valve 100, cannot be ferromagnetic, the material preferably being aluminum or brass, and therefore unwanted magnetic interferences are prevented.

The electromagnetic valve 100 comprises the ferromagnetic element 73 for making it bi-stable. The ferromagnetic element 73 is positioned such that with respect to the other components of the electromagnetic actuator 70, such as the magnet 71 and the coil 72, when the closure member 50 is in the closed position, there is a certain distance between the permanent magnet 71 and the inner end to the body 80 of the ferromagnetic element 73, the distance being covered by the closure base 110, made of a non-metallic material and therefore acting as a separator for both parts. The magnetic field M generated by the magnet 71 closes at the inner end of the ferromagnetic element 73, the magnetic field lines closing between each end of the closure member 50 and the corresponding portion of the inner end of the ferromagnetic element 73. An attractive force is exerted, assuring the closed position of the closure member 50. This magnetic attraction is maintained whatever the position of the pivoting point of the closure member 50 is, whether in the upper portion, as shown in FIG. 3, or in the lower portion, or in any other angular position.

Likewise, when the closure member 50 is in the open position, the magnetic field M generated by the magnet 71 also closes at the inner end of the ferromagnetic element 73, in this situation the magnetic field lines closing between each face of the plate forming the closure member 50 and the corresponding portion of the inner end of the ferromagnetic element 73. An attractive force is exerted, assuring the open position of the closure member 50, overcoming the action of gravity. This magnetic attraction is maintained whatever the position of the pivoting point of the closure member 50 is, whether in the upper portion, like that shown in FIG. 4, or in any other angular position where gravity has less of an effect.

When the coil 72 is powered with an electric pulse having a given polarity, at least the portion of the ferromagnetic element 73 that is arranged inside the body 80, and inside the inner space of the coil 72, is inside the magnetic field C generated by the coil 72, cooperation between the magnetic field M of the permanent magnet 71 and the magnetic field C of the coil 72 itself taking place as a result. So due to its ferromagnetic properties, when the closure member 50 is in the closed position, the magnetic field C generated by the coil 72 generates at the inner end of the ferromagnetic element 73 a magnetic field with the same sign as the sign on the closure face of the closure member 50 produced by the magnetic field M of the permanent magnet 71 when it is in the closed position, a repulsion of the magnet 71 on the pivoting point taking place, leading to the open position. As described above, this open position of the closure member 50 is kept stable.

When the closure member 50 is in the open position, and the coil 72 is powered with an electric pulse having a polarity that is opposite the preceding one, the magnetic field C generated by the coil 72 generates at the inner end of the ferromagnetic element 73 a magnetic field with a sign opposite the sign on the closure face of the closure member 50 produced by the magnetic field M of the permanent magnet 71 when it is in the open position, attraction of the magnet 71 on the pivoting point taking place, leading to the closed position. As described above, this closed position of the closure member 50 is kept stable.

The power supply of the electromagnetic actuator 70 therefore does not require being maintained in order to keep the electromagnetic valve 100 open or closed, thereby achieving lower consumption and a bi-stable behavior in the electromagnetic valve 100.

Figure 1:
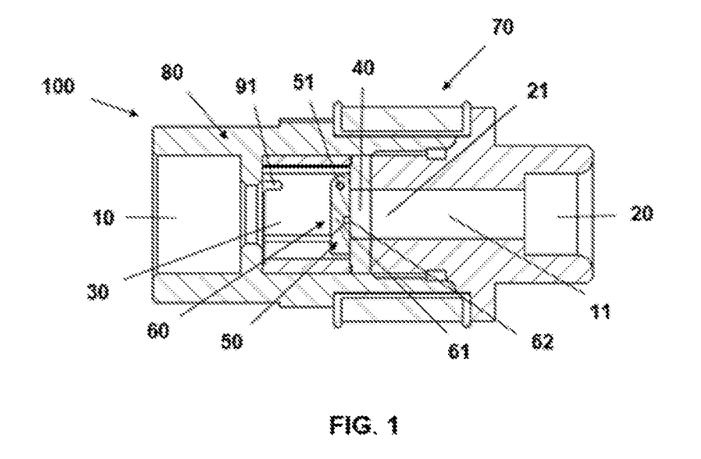
FIG. 1 shows a longitudinal section view of an embodiment of an electromagnetic gas valve with the closure member in a closed position with respect to the closure hole.
Figure 2:
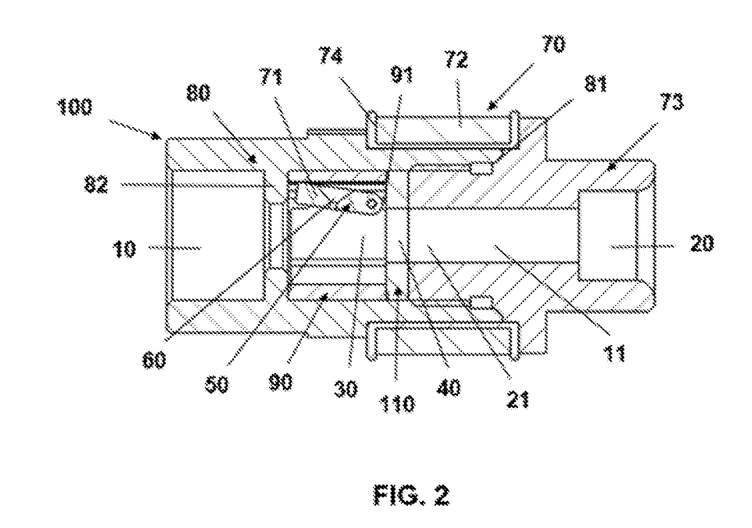
FIG. 2 shows a longitudinal section view of the electromagnetic valve of FIG. 1, with the closure member in an open position with respect to the closure hole.

In this embodiment of the electromagnetic valve 100, the secondary fluid channel 60 comprises a conical region 61 with its base that is more open on the face of the closure member 50 that is facing the gas inlet 10 in the closed position, and a calibrated hole 62, which is in fluid communication with the conical region 61, that is facing the gas outlet 11 in the closed position. So, when the closure member 50 is in the closed position, the flow of gas coming from the gas inlet 10 runs into an aerodynamic section, which is the conical region 61, ending in a circular hole, which is the calibrated hole 62, facilitating the flow of gas through the secondary fluid channel. Depending on the section given to the calibrated hole 62, a larger or smaller flow of gas therethrough will be obtained when the electromagnetic valve 100 is in the closed position.

A second aspect relates to a gas regulating valve 300 comprising an electromagnetic gas valve 100 with a configuration like the one described above, wherein the electromagnetic valve 100 is in the form of connector that allows it to be attached to other elements of a gas burner arrangement, for example. A gas burner arrangement (not shown in the drawings) includes, for example in the prior art, a gas burner, a first manual gas regulating valve for regulating the flow of gas to the gas burner, a second gas valve that is an electromagnetic gas valve after the gas regulating valve, and a gas pipe communicating the two gas valves arranged in series, and communicating them with the gas burner.

Figure 5:
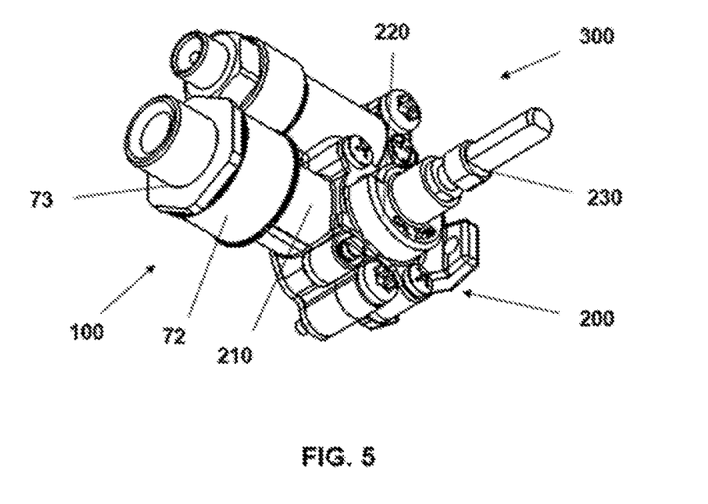
FIG. 5 shows a perspective view of an embodiment of a gas regulating valve with the electromagnetic gas valve arranged in a gas outlet conduit.
Figure 6:
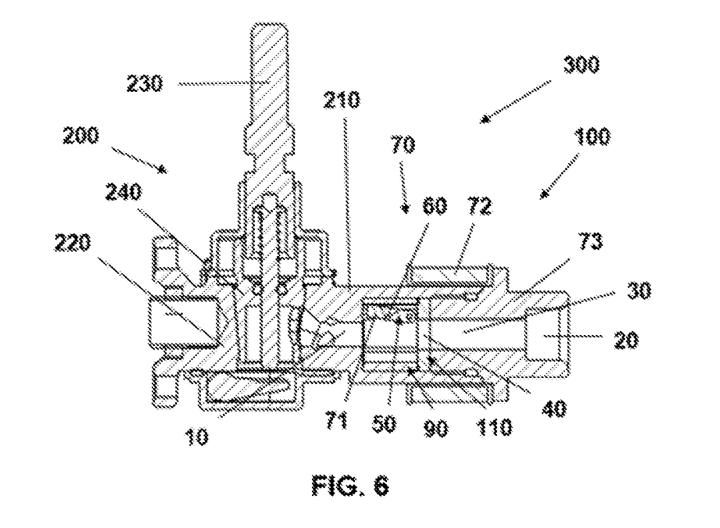
FIG. 6 shows a longitudinal section view of the gas regulating valve of FIG. 5, with the closure member of the electromagnetic gas valve in an open position.
Figure 7:
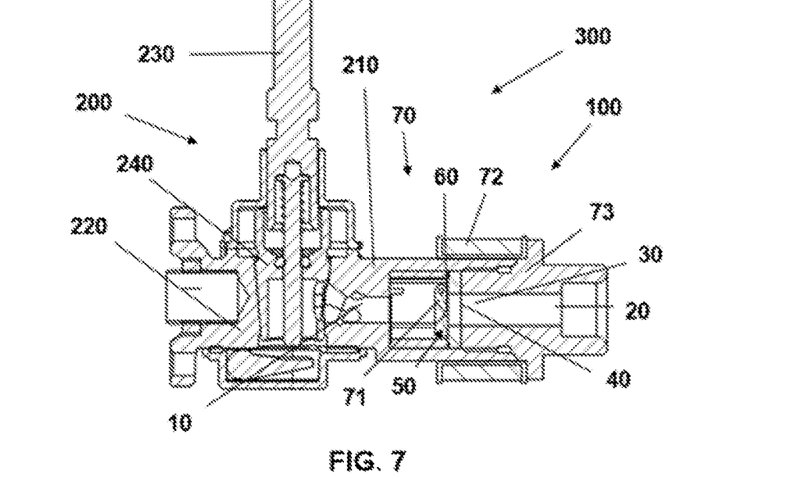
FIG. 7 shows a longitudinal section view of the gas regulating valve of FIG. 5, with the closure member of the electromagnetic gas valve in a closed position.

FIGS. 5 to 7 show an embodiment of a gas regulating valve 300 with the electromagnetic gas valve 100 arranged in the gas outlet conduit 210 of a standard manual gas regulating valve 200 already known in the prior art. This electromagnetic valve 100 is no longer an independent electromagnetic valve, but rather is adapted to the construction of the manual gas regulating valve 200, in which the outlet conduit 210 has been modified.

In this embodiment of the gas regulating valve 300 the gas outlet conduit 210 of the manual gas regulating valve 200 comprises the gas inlet 10 of the electromagnetic gas valve 100. The manual gas regulating valve 200 comprises a valve body 220, a regulating element 240 for regulating the flow of gas arranged in the body 220, and a rotating shaft 230 is coupled to the regulating element. So, when the user wants to regulate the flow of gas at the outlet of the gas regulating valve 300, the user turns the shaft 230 to a given position, the regulating element 240 turns with the shaft 230, and a given flow of gas comes out of an open of the regulating element 240 towards the gas outlet conduit 210.

This electromagnetic valve 100 is configured for being assembled in the gas outlet conduit 210 of the manual gas regulating valve 200. The gas outlet conduit 210 is configured for performing the function of the body 80 of the independent electromagnetic valve 100 described above. This gas outlet conduit 210 comprises the gas inlet 10 of the electromagnetic gas valve 100, in fluid communication with the outlet of the regulating element 240. The main fluid channel 30 is arranged inside the gas outlet conduit 210, and the guide 90 incorporating the closure member 50 comprising the magnet 71 and the closure base 110 are arranged inside this main fluid channel 30. The reel 74 is arranged on the outside of the gas outlet conduit 210, and the coil 72 is wound on the reel 74 in a fixed manner. The ferromagnetic element 73 is coupled to the gas outlet conduit 210 to complete the electromagnetic valve 100. The operation of the electromagnetic actuator 70, and therefore of the cooperative association of the magnetic field generated by the magnet 71 and the magnetic field C generated by the coil 72 is the same as that described for the independent electromagnetic valve 100. Therefore, and by means of the electric power supply of the coil 72, displacement of the closure member 50 between the open position and the closed position is achieved.

Externally incorporating only the ferromagnetic element 73 in the manual gas regulating valve 200, allows obtaining a gas regulating electromagnetic valve 300 that is much more compact than an assembly of manual gas regulating valve and electromagnetic valve that are attached to one another by means of a gas pipe. As previously stated, the connecting pipe is avoided in this new gas regulating electromagnetic valve 300, as the electromagnetic valve 100 is coupled to the manual gas regulating valve 200, a gas regulating electromagnetic valve 300 being obtained that is more compact than the electromagnetic valves of the prior art, because it furthermore does not comprise separate main fluid and secondary fluid channels since the secondary fluid channel is configured by restricting the main fluid channel.

Figure 9:
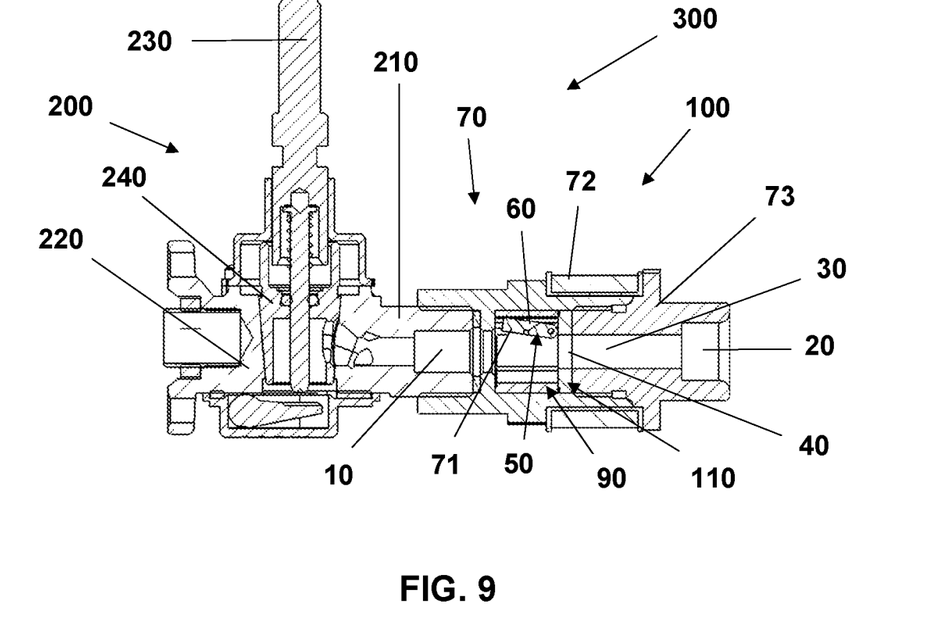
FIG. 9 shows an assembly that includes an electromagnetic gas valve that is directly attached to a gas outlet conduit of a gas regulating valve, with the closure member of the electromagnetic gas valve in an open position.
Figure 10:
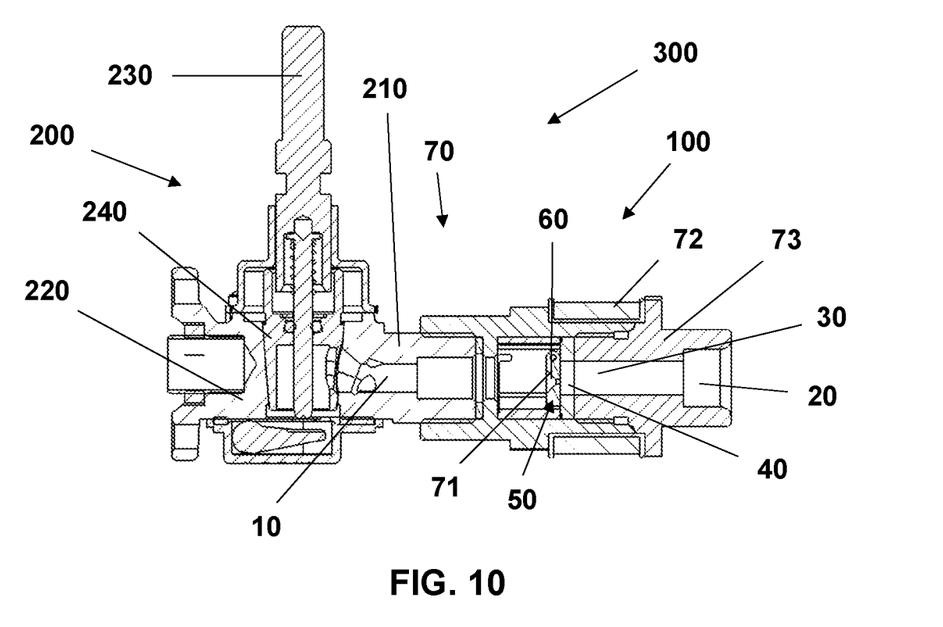
FIG. 10 shows the assembly of FIG. 9 with the closure member of the electromagnetic gas valve in a closed position.

In a second embodiment of the gas regulating electromagnetic valve 300 as shown in FIGS. 9 and 10, the gas regulating valve 300 comprises the independent electromagnetic gas valve 100 described above, which is coupled to a conventional gas regulating valve in which no modification is made. This independent electromagnetic gas valve 100 is fluidly coupled by means of the threading of one end, i.e., where the gas inlet 10 is located, with the threading of the end of the gas outlet conduit of the conventional manual gas regulating valve. This thereby allows obtaining a gas regulating valve that is less compact than the gas regulating valve 300 of the first embodiment, but more compact than the assembly of manual gas regulating valve and electromagnetic valve that are attached to one another by means of a gas pipe.

Figure 8:
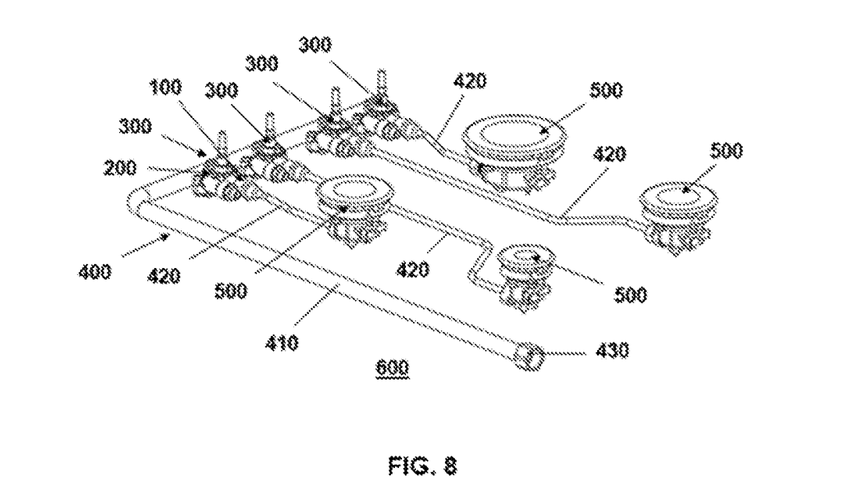
FIG. 8 shows a partial view of an embodiment of a gas cooking appliance.

A third aspect relates to a gas cooking appliance 600, as partially shown in FIG. 8. The gas cooking appliance 600 is depicted by means of a gas burner arrangement and comprises in this embodiment four gas burners 500 having a different heat power, one gas regulating electromagnetic valve 300 for each gas burner 500, in which each gas regulating valve 300 comprises a manual gas regulating valve 200 coupled with an electromagnetic valve 100 of the invention.

A gas pipe 400 allows fluid communication from an external gas supply source (not depicted in the drawing), to which it is attached by means of a nut 430, through a first portion of gas pipe 410 leading the gas to each of the gas regulating valves 300. The gas pipe 400 comprises a second portion of gas pipe 420 leading the gas from each of the gas regulating valves 300 to each respective gas burner 500. The electromagnetic gas valve separated from the manual gas regulating valve as occurs in the prior art is dispensed with in the gas cooking appliance 600 of the invention, with the subsequent advantages in terms of space taken up, simplicity and cost.

What is claimed is:
1. An electromagnetic gas valve comprising:
a body made of a non-ferromagnetic material, the body having a gas inlet and a gas outlet, a main fluid channel that communicates the gas inlet with the gas outlet;
a closure hole located in the main fluid channel; and
a closure member located in the body that pivots between an open position and a closed position, the closure member having a first side, a second side opposite the first side and a permanently open internal fluid channel extending between the first and second sides, in the open position the closure member does not close against the closure hole to facilitate a passing of a maximum gas flow through the closure hole, in the closed position the closure member closes against the closure hole so that gas flow is permitted only through the internal fluid channel of the closure member, at least a portion of the internal fluid channel calibrated to provide a minimum gas flow through the closure hole when the closure member is in the closed position;

the closure member comprises at least in part a magnet that generates a first magnetic field, the electromagnetic gas valve including a coil that when supplied with a first type of current generates a second magnetic field that is attractive to the first magnetic field, the coil when supplied with a second type of current generates a third magnetic field that is repulsive to the first magnetic field, an interaction of the first and second magnetic fields causing the displacement of the closure member from the open position to the closed position; an interaction of the first and third magnetic fields causing the displacement of the closure member from the closed position to the open position.

2. The electromagnetic gas valve according to claim 1, wherein the closure member is formed entirely of the magnet.

3. The electromagnetic gas valve according to claim 1 wherein the magnet is a permanent magnet.

4. The electromagnetic valve according to claim 3, further comprising a ferromagnetic element positioned with respect to the closure member so that the closure member is attracted toward the ferromagnetic element due to the action of the first magnetic field generated by the permanent magnet.

5. The electromagnetic valve according to claim 4, wherein when the closure member is in the closed position, the closure member is moveable to the open position only upon the coil generating the third magnetic field.

6. The electromagnetic gas valve according to claim 5, wherein the ferromagnetic element comprises a gas inlet and a gas outlet in fluid communication with one another, the gas outlet of the body being coupled to the gas inlet of the ferromagnetic element, the main fluid channel being defined inside the body and inside the ferromagnetic element between the gas inlet of the body and the gas outlet of the ferromagnetic element, the coil being arranged wound on the outside of the body.

7. The electromagnetic gas valve according to claim 4, wherein the coil is wound about a plastic reel having a first end and a second end opposite the first end, the first end of the reel abuts a projection of the body and the second end of the reel abuts a projection of the ferromagnetic element.

8. The electromagnetic gas valve according to claim 1, wherein the closure member is a plate that pivots with respect to a pivoting shaft between the open position and the closed position.

9. The electromagnetic gas valve according to claim 8, further comprising a ferromagnetic element and a guide, the magnet is a permanent magnet, the ferromagnetic element positioned with respect to the closure member so that the closure member is attracted toward the ferromagnetic element due to the action of the first magnetic field generated by the permanent magnet, the guide arranged tightly against a first inner wall section of the main fluid channel inside the body, the guide being internally hollow allowing fluid communication between the gas inlet of the body and a gas outlet of the ferromagnetic element, the closure member being pivotally coupled to the guide.

10. The electromagnetic valve according to claim 9, wherein the guide is made of a plastic material.

11. The electromagnetic gas valve according to claim 9, wherein the guide comprises at least one pivoting guide on an inner wall thereof, the pivoting shaft of the closure member being fitted in the pivoting guide, the pivoting guide allowing a linear displacement of the pivoting shaft inside the guide.

12. The electromagnetic gas valve according to claim 9, further comprising a closure base made of an elastomeric material and arranged tightly against a second section of the inner wall of the main fluid channel, the closure base being internally hollow, defining the closure hole, and arranged butting against the ferromagnetic element.

13. The electromagnetic gas valve according to claim 12, wherein the body comprises an inner stop arranged in the main fluid channel, the guide having a first end that abuts the stop and an opposite second end that abuts the closure base.

14. The electromagnetic gas valve according to claim 1, wherein the internal fluid channel of the closure member comprises a conical region having a first end of a first diameter and a second end of a second diameter, the first diameter being greater than the second diameter, the first end facing the gas inlet of the body when the closure member is in the closed position, the internal fluid channel further including a hole that communicates the second end of the conical region with the second side of the closure member, the hole calibrated to provide the minimum gas flow through the closure hole.

15. A gas regulating valve assembly comprising:
a manual gas regulating valve comprising:
a valve body having a gas inlet conduit and a gas outlet conduit;
a rotatable regulating element located in the valve body that regulates a flow of gas between the gas inlet conduit and the gas outlet conduit;
the valve body including a first part in which resides the gas inlet conduit, a second part in which resides the rotatable regulating element, and a third part in which resides the gas outlet conduit;
an electromagnetic gas valve comprising:
the third part of the valve body of the manual gas regulating valve, the third part of the valve body including a main fluid channel that communicates the gas outlet conduit of the manual gas regulating valve with a closure hole located inside the third part of the valve body downstream of the gas outlet conduit; and
a closure member located in the third part of the valve body of the manual gas regulating valve, the closure member being displaceable between an open position and a closed position, the closure member having a first side, a second side opposite the first side and an internal fluid channel extending between the first and second sides, in the open position the closure member does not close against the closure hole to facilitate a passing of a maximum gas flow through the closure hole, in the closed position the closure member closes against the closure hole so that gas flow is permitted only through the internal fluid channel located of the closure member, at least a portion of the internal fluid channel calibrated to provide a minimum gas flow through the closure hole when the closure member is in the closed position;
the electromagnetic gas valve includes a ferromagnetic element coupled to and at least partially residing in the third part of the valve body, the ferromagnetic element including a through fluid channel that is in fluid communication with the closure hole, the through fluid channel having a gas outlet through which gas exits the gas regulating valve assembly;

the closure member comprises at least in part a magnet that generates a first magnetic field, the electromagnetic valve including a coil that when supplied with a first type of current generates a second magnetic field that is attractive to the first magnetic field, the coil when supplied with a second type of current generates a third magnetic field that is repulsive to the first magnetic field, an interaction of the first and second magnetic fields causing the displacement of the closure member from the open position to the closed position; an interaction of the first and third magnetic fields causing the displacement of the closure member from the closed position to the open position.

16. The gas regulating valve assembly according to claim 15 wherein the magnet is a permanent magnet.

17. The gas regulating valve assembly according to claim 16, wherein the ferromagnetic element is positioned with respect to the closure member so that the closure member is attracted toward the ferromagnetic element due to the action of the first magnetic field generated by the permanent magnet.

18. The gas regulating valve assembly according to claim 15, wherein a first part of the ferromagnetic element resides in the third part of the body and a second part of the ferromagnetic element resides outside the third part of the body, the coil being wound about a reel, the reel being disposed between the third part of the valve body of the manual gas regulating valve and the second part of the ferromagnetic element.

* * * * *